(12) United States Patent
Callanan et al.

(10) Patent No.: US 7,774,417 B2
(45) Date of Patent: Aug. 10, 2010

(54) METHOD AND SYSTEM FOR SEQUENCING OF ELECTRONIC MAIL TO DERIVE A SPECIFIED RESPONSE TRAJECTORY

(75) Inventors: Sean Callanan, Dublin (IE); Gary Denner, County Kildare (IE); Ruthie D. Lyle, Durham, NC (US); Patrick J. O'Sullivan, Dublin (IE); Carol Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 11/854,838

(22) Filed: Sep. 13, 2007

(65) Prior Publication Data

US 2009/0077178 A1    Mar. 19, 2009

(51) Int. Cl.
*G06F 15/16* (2006.01)
*G06F 12/00* (2006.01)
(52) U.S. Cl. ........................... 709/206; 709/207
(58) Field of Classification Search .............. 709/206, 709/207, 250
See application file for complete search history.

(56) References Cited

U.S. PATENT DOCUMENTS

| 5,978,836 | A  | * | 11/1999 | Ouchi ............... 709/206 |
| 7,546,346 | B2 | * | 6/2009 | Ouchi ............... 709/206 |
| 2004/0149890 | A1 | * | 8/2004 | Yoshida ............ 250/214.1 |
| 2005/0015451 | A1 | * | 1/2005 | Sheldon et al. ...... 709/206 |
| 2005/0055410 | A1 | * | 3/2005 | Landsman et al. .... 709/206 |
| 2009/0077178 | A1 | * | 3/2009 | Callanan et al. ..... 709/206 |

\* cited by examiner

*Primary Examiner*—Zarni Maung
(74) *Attorney, Agent, or Firm*—Cantor Colburn LLP; Daniel McLoughlin

(57) ABSTRACT

A method for electronic mail (email) distribution and collaboration, the method includes: composing an email message; designating one or more recipients for the email message; assigning a status to each of the one or more recipients; specifying an order of delivery of the email message to the one or more recipients; specifying a required response time period to the email message by the one or more recipients; and specifying a priority order of responses to the email message by the one or more recipients.

12 Claims, 4 Drawing Sheets

METHOD AND SYSTEM FOR SEQUENCING OF ELECTRONIC MAIL TO DERIVE A SPECIFIED RESPONSE TRAJECTORY

BACKGROUND OF THE INVENTION

1. Field of the Invention

This invention relates generally to computer software, and more particularly to a method and system for specifying the order of delivery of electronic mail to recipients, and the timing requirements for and priority of recipient responses to electronic mail.

2. Description of the Related Art

Electronic mail (email) has become a central feature of modern life and users have come to expect to receive electronic mail messages at any time and in virtually any place. For example, during the course of one day of travel, a user may receive electronic mail messages at a home desktop computer in the early morning, an office desktop computer in midmorning, via a cell phone or personal digital assistant in a taxi on the way to the airport, on a laptop computer via a wireless local area network while waiting in the airport lounge, via an in-flight telephone on the airplane, and in a hotel room via a high-speed Internet connection provided by the hotel at the end of the day.

The widespread proliferation and availability of electronic messaging has provided an efficient method to communicate information. In fact, electronic messaging (with its near instantaneous delivery from sender to receiver) is the preferred method of personnel and business communication where hardcopy signatures are not required. In addition, the ease of use and minimal cost of distribution has led to mass email to large distribution lists, as well as using email as a broad collaborative tool.

SUMMARY OF THE INVENTION

Embodiments of the present invention include a method, article, and system for electronic mail (email) distribution and collaboration, wherein the method includes: composing an email message; designating one or more recipients for the email message; assigning a status to each of the one or more recipients; specifying an order of delivery of the email message to the one or more recipients; specifying a required response time period to the email message by the one or more recipients; and specifying a priority order of responses to the email message by the one or more recipients.

An article comprising one or more computer-readable storage media containing instructions that when executed by a computer enables electronic mail (email) distribution and collaboration; wherein the method further includes: receiving an email message from an originating composer; wherein the received email message has one or more designated recipients for the email; wherein a status has been assigned to the one or more designated recipients; wherein a specified order of delivery, a required response time period, and a priority order of responses has been assigned to the one or more designated recipients; distributing the email message based on the assigned status and specified order of delivery to the one or more designated recipients; and relaying email message responses from the one or more designated recipients to the originating composer based on the assigned priority order.

A system for electronic mail (email) distribution and collaboration, the system includes: one or more server devices in communication with one or more client devices through a network; wherein the one or more client devices are configured to allow an originating user to do the following: compose an email message; designate one or more recipients for the email message; assign a status to each of the one or more designated recipients; specify an order of delivery of the email message to the one or more designated recipients; specify a required response time period to the email message by the one or more designated recipients; specify a priority order of responses to the email message by the one or more designated recipients; and wherein the one or more server devices are configured to do the following: distribute the email message based on the assigned status and specified order of delivery to the one or more designated recipients; and relaying email message responses from the one or more designated recipients to the originating user based on the assigned priority order.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, a solution is technically achieved for a method, article, and system for specifying the order of delivery of electronic mail to recipients, and the required timing for and the priority of recipient responses to electronic mail.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figures 1A, 1B:
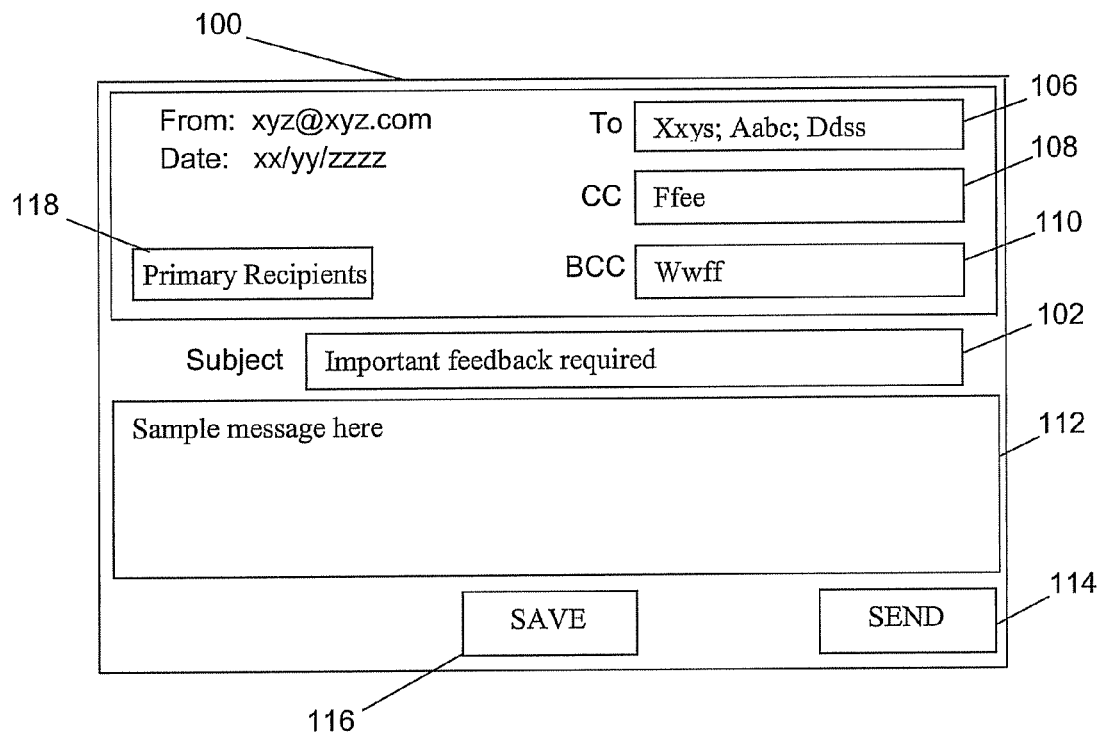
FIGS. 1A-1E illustrate various graphical user interface views related to the generation, sending, and reception of an electronic message that features the timing and priority features for recipients according to embodiments of the invention.

The detailed description explains the preferred embodiments of the invention, together with advantages and features, by way of example with reference to the drawings.

DETAILED DESCRIPTION

The explosive growth in the use of email has led to the use of email as a collaborative tool where many recipients are copied, and many recipients respond to the received electronic messages and associated content. However, the mechanisms that are presently available to send, receive and process email and content therein are not optimal for effective collaboration.

For example, situations arise where guiding of recipient responses to an originating email represents an obstacle to effective collaboration. Specifically, situations oftentimes arise where one individual sends an email to a plurality of individuals, where the responses to the originating email should follow desired response trajectories. For example, a sender may choose to send an email to an upper level manager and copy six other individuals or peers. The sender may desire a response from their manager prior to receiving responses from the other copied individuals. In the conventional art, the other responses can "get in the way", happen first, represent distractions, prejudice or change the course of the email conversation in an adverse manner. Therefore, a mechanism is required to make email more useful for situations requiring broad collaboration.

Embodiments of the invention provide a method and system for specifying the order of delivery of electronic mail to recipients, and the timing for and priority of recipient responses to the electronic mail.

Embodiments of the invention are configured for an originating sender to associate preferences with an email, where the preferences specify a primary set of priority recipients along with a time-line, and where the email is only routed to these recipients until the configured time has expired, after which the email is routed to other copied recipient individuals. Embodiments of the invention provide an ability to specify priority recipients along with visual cues that indicate they are priority recipients, disallowing other copied individuals from becoming involved until some defined subset of the primary recipients have expressed an opinion or until a time value has lapsed. Embodiments of the invention allow an email originator to send an email to a plurality of individuals and establish a seminal response trajectory in an email thread, by providing the originator with a set of configuration and temporal preferences to guide the receipt and responses to the email with absolute precision.

Embodiments of the invention are configured for an email originator to create and furnish an email message body, subject, and address fields (e.g., to, carbon copy (cc), and blind carbon copy (bcc)) in a conventional manner. However, with embodiments of the invention, the originator, prior to sending the email, has the ability to designate a set of primary (priority) recipients, as well as secondary (non priority) recipients for whom the delivery of the email will be deferred until a period of time has elapsed. In other instances, the email may be sent to both the primary and secondary recipients concurrently, however the ability of the secondary recipients to respond may be limited until the primary recipients have responded. Additionally, in embodiments of the invention there are visual cues in the email that allow the originators to acknowledge that they are primary recipients—conveying that knowledge that they have the benefit of "first response/say" along with the knowledge of how much time they have for their response (a value configured by the originator and assigned to the email). The primary recipient response time value may be deterministic (e.g., 24 hours from the time sent) or variable (e.g., 12 hours from the time received, 6 hours from the time received and read/opened).

In embodiments of the invention, a workflow engine is associated with a message (mail) transfer agent (MTA). An MTA is a computer program or software agent that accepts mail from user agents, delivers messages to user agents, and forwards messages to other MTAs, where a user agent is a program that provides access to the mail system. The program facilitates users in composing, sending, and receiving mail. The workflow engine accepts the originator settings that are associated with the defined primary recipients, and defers email delivery to the non-primary recipients' mailboxes until the timeline for preferential responses has expired, after which the secondary recipients will receive the email. The responses from the prioritized recipients will allow the MTA to release the original mail to all defined mailboxes, thereby respecting the overall response trajectory.

In embodiments of the invention, an originating sender may define that a lack of response to the originator's email from one or more of the primary recipients will result in the non-delivery of the email to the secondary recipients. By informing the primary recipients that their responses are required for the email to continue to the other recipients, the primary recipients are motivated to supply a timely response to the originator. In addition, the email originator may configure multiple primary recipients and associate a unique response timeline for one, some, or all of the primary recipients. When assigning different response timelines for all or some of the primary recipients, the originator may also configure how and when the email is advanced to the larger distribution list. Options include, but are not limited to, sending after the first primary recipient has responded, sending after all recipients have responded, sending after a certain number have responded, etc. Likewise, in various embodiments an email originator may configure multiple primary recipients and within this subset also generate sub priority response criteria. This latter point can be useful in instances where the target email audience is large and hierarchical. In addition, the sub priority response criteria may also be extended in a variety of ways including, for example, by geography, organization, hierarchy stature, or project assignments.

Embodiments of the invention are configured for an originator to establish a response hierarchy by way of a decision tree that is associated with the email. This may, for example, achieve a desired result where a response from recipients A, B, C is desired, but the response is desired in a specific order (e.g. A first, B second and C third). Associated with the email workflow/logic are response cues that allow individuals to understand they have the ability to respond, and a time value is associated with their response. Likewise, when recipients try to respond prematurely (in situations where the MTA has not deferred delivery) visual cues will disallow this, and visual cues will come back to them when the "sweet spot" or allowed time window has been achieved. In addition, the visual cues will alert the recipients to this sweet spot, as well as attention reminders when the timeline associated with a response is about to expire.

In embodiments of the invention, the originator may specify a staging for response handling. For example, the originator may specify that a primary recipient response may only be visible to the originator, to the originator and the other primary recipients, or that the primary recipient responses are sent to everyone in the distribution list, including the secondary recipients. Furthermore, the originator may specify that primary recipient responses are only visible (sent) to the secondary recipients after the secondary recipients receive the originating email.

In embodiments of the invention, responses generated by the primary recipients may be collected and embedded within the email as a series of responses that are then sent to the secondary recipients in the general distribution list. The collecting and appending of primary recipient responses provides a key opportunity for decision makers and stakeholders to influence the succeeding discussions. The originator may alter the email prior to the emails distribution to the secondary recipients utilizing the feedback of the primary recipients. In addition, the primary recipients may be allowed to review each other's responses, when multiple priority recipients are specified.

Embodiments of the invention utilize a combination of a revised user interface (UT) and a workflow engine that introduces additional semantics in the email, where the semantics are configured around the originator's preferences specific to response trajectories. Embodiments of the invention exploit extension points in the email offered by the email request for change (RFC) to associate preferences from the originator, and trivial modifications to the MTA to control outbound delivery relative to the originator's preferences. RFC refers to an identification and tracking mechanism for enhancements and/or modifications to agreed upon standards In embodiments of the invention, email formats are directly associated with email RFCs in terms of format, presentation, and semantics associated with email fields such as, to, from, cc, bcc, subject, body, and attachments. Current RFCs do not directly support the ability to embed additional content or decisions in email as described herein. However, RFCs provide extension points that can be exploited to accommodate the additional embedded content. RFCs associated with mail routing protocols (such as, simple mail transfer protocol (SMTP)) promote the conventional form of subject/body/links/references and likewise do not provide the explicit semantics described above. However, the RFCs have been written with a view to extensibility, therefore aspects of the embodiments described herein would imply two cooperating host and destination systems. For example, embodiments of the invention may be implemented in International Business Machines Lotus Notes® where the new semantics introduced by embodiments of the invention would be exploited based on modifications made, but in instances where the same mail were used/viewed/forwarded to a non-cooperating system these semantics would simply disappear. This presently occurs with Lotus Notes today, where semantics such as confidential, priority and so forth carry well between cooperating email systems, and workflow associated with these semantics stay silent when alternate email systems are in play. Therefore, implementations of embodiments of the invention require the exploitation of extension points that exist in the email RFCs so as to embed the new semantics and the associated workflow.

FIGS. 1A-1E illustrate various graphical user interface views related to the generation, sending, and reception of an electronic message that features the timing and priority features for recipients according to embodiments of the invention. In FIG. 1A an originating message sender opens a graphical user interface (GUI) email template 100, and enters an email subject in box 102, a text message in box 112, and populates the address fields (to 106, cc 108, and bcc 110), as they would in a customary email. The originator may then proceed to specify the recipient priority and timing features of the present invention by activating the "Primary Recipients" button 118. Upon activation of the "Primary Recipients" button 118, a new user interface (UI) window 120 or dialog box opens, and is illustrated in FIG. 1B. The UI 120 is configured with four columns of information ((1) a recipient listing 122 as specified in the originating email address/distribution fields (to, cc, bcc; noting which field specification they are found in), (2) selection boxes 124 for designating the primary recipients (may also specify names in a 'pick all' manner (not shown)), (3) time to respond 126, and (4) rules for time clock to start 128 (examples: time email sent, time email received, time email opened). The times to respond 126 and time clock rules 128 may be chosen from a pull down selection menus as illustrated in pull down box 130 for the selection of a time clock rule for recipient Wwff of the last row of UI 120. The originating message sender may then save 116 or send 114 the email.

Figures 1C, 1D, 1E:
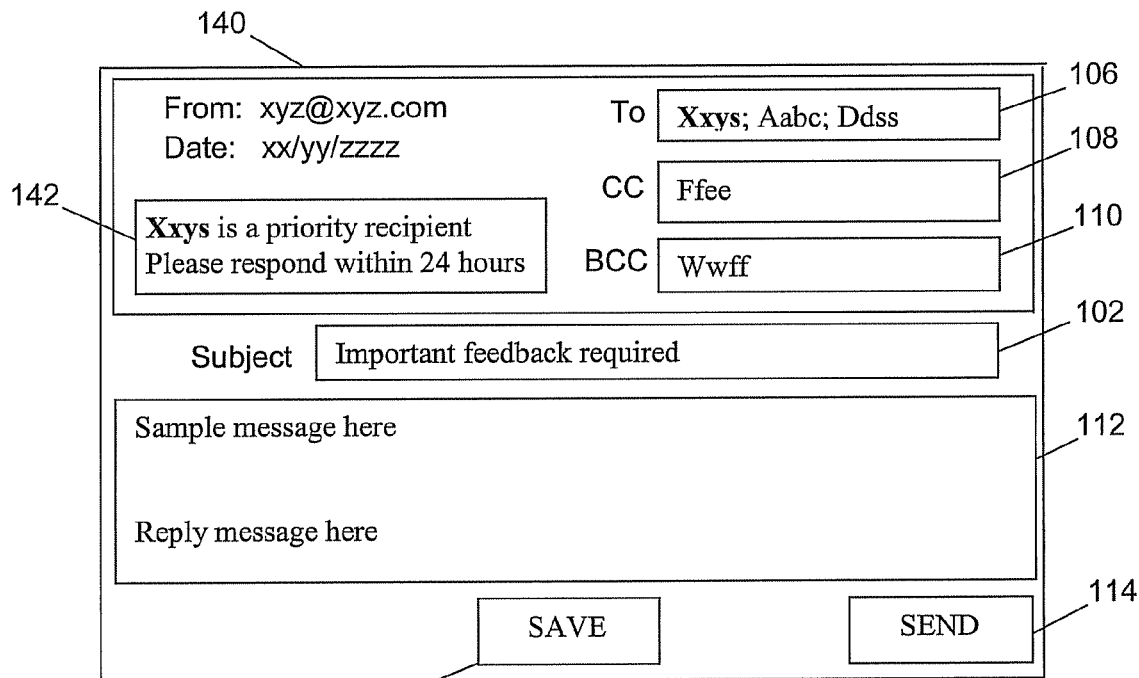

FIG. 1C illustrates a priority recipients received version 140 of the originators email 100 according to embodiments of the invention. In this example, priority recipient Xxys is identified as a priority recipient and asked to respond to the originator xyz within 24 hours in information box 142.

FIG. 1D illustrates an exemplary outbox 150, according to embodiments of the invention, for the originator xyz that identifies recipients of sent emails in column 152, the subject of the sent email in column 154, and the date the email was sent 156. An icon 158 appears next to the recipient names to indicate that they have timing requirement for their responses, as well as indicating which are primary recipients. The icon 158 may be in the shape of an hourglass (shown), a timepiece such as a clock face, or other appropriate symbols. An additional feature of the icon may provide the time left for a required response, which may be displayed to the originating user when their mouse or pointer hovers over the icon 158 on a display screen. When the email has been sent to the entire distribution list (i.e., the secondary recipients) the icon 158 may disappear, as the necessity for timed entries is no longer required.

FIG. 1E illustrates an exemplary inbox 160, according to embodiments of the invention, for the recipient Xxys that identifies senders of received emails in column 162, the subject of the received email in column 164, and the date the email was received 166. The icon 158 appears next to the received names to indicate that these emails have timing requirement for their responses, as well as indicating to the receiver that they have been designated primary recipients by the originator of the email.

Figure 2:
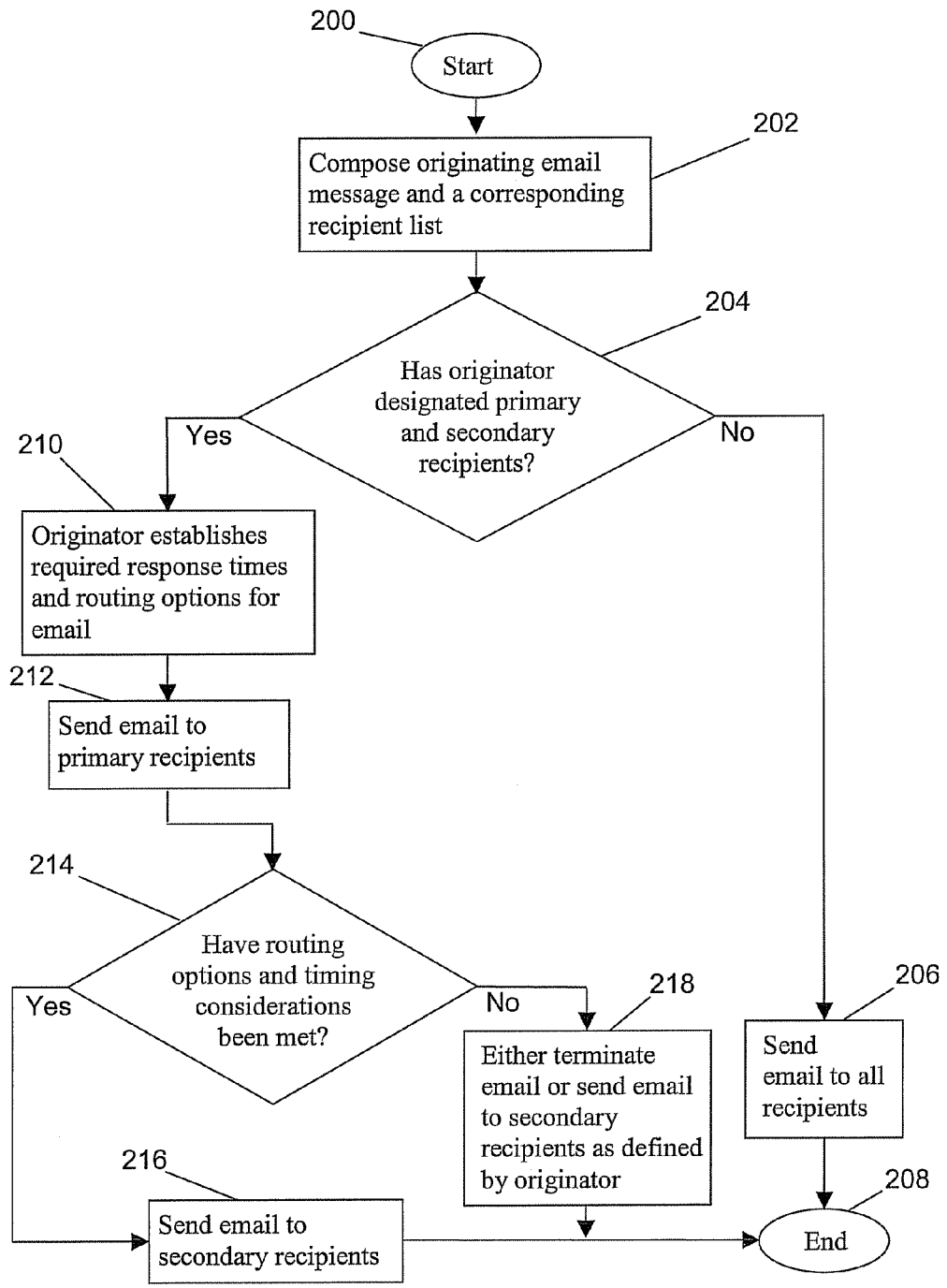
FIG. 2 illustrates a flow chart for the generation of an email according to an embodiment of the invention.

FIG. 2 illustrates a flow chart for the generation of an email according to an embodiment of the invention. The example in FIG. 2 is limited to a two-tiered staging of email delivery with primary and secondary recipients. However, more complex staging scenarios may be achieved with embodiments of the invention, where additional tiers of recipients are specified. The process starts (block 200) with an originating sender composing an email message and populating the address fields (106, 108, and 110 of FIG. 1A) with a corresponding recipient list (block 202). The originator may then designate primary and secondary recipients (decision block 204). If the originating sender chooses not to designate primary and secondary recipients (decision block 204 is No) the email is sent to all recipients (block 206) and the process ends (block 208). If the originating sender chooses to designate primary and secondary recipients (decision block 204 is Yes), the originator establishes required response times for the primary recipients and routing options for the email (block 210) as described previously, and the email is sent to the primary recipients (block 212). If the routing options and timing considerations have been met (decision block 214 is Yes), the email is sent to the secondary recipients (block 216) and the process ends (block 208). If the routing options and timing considerations have not been met (decision block 214 is No), the email is either terminated or sent to the secondary recipients as defined by the originator (block 218), and the process ends (block 208).

Figure 3:
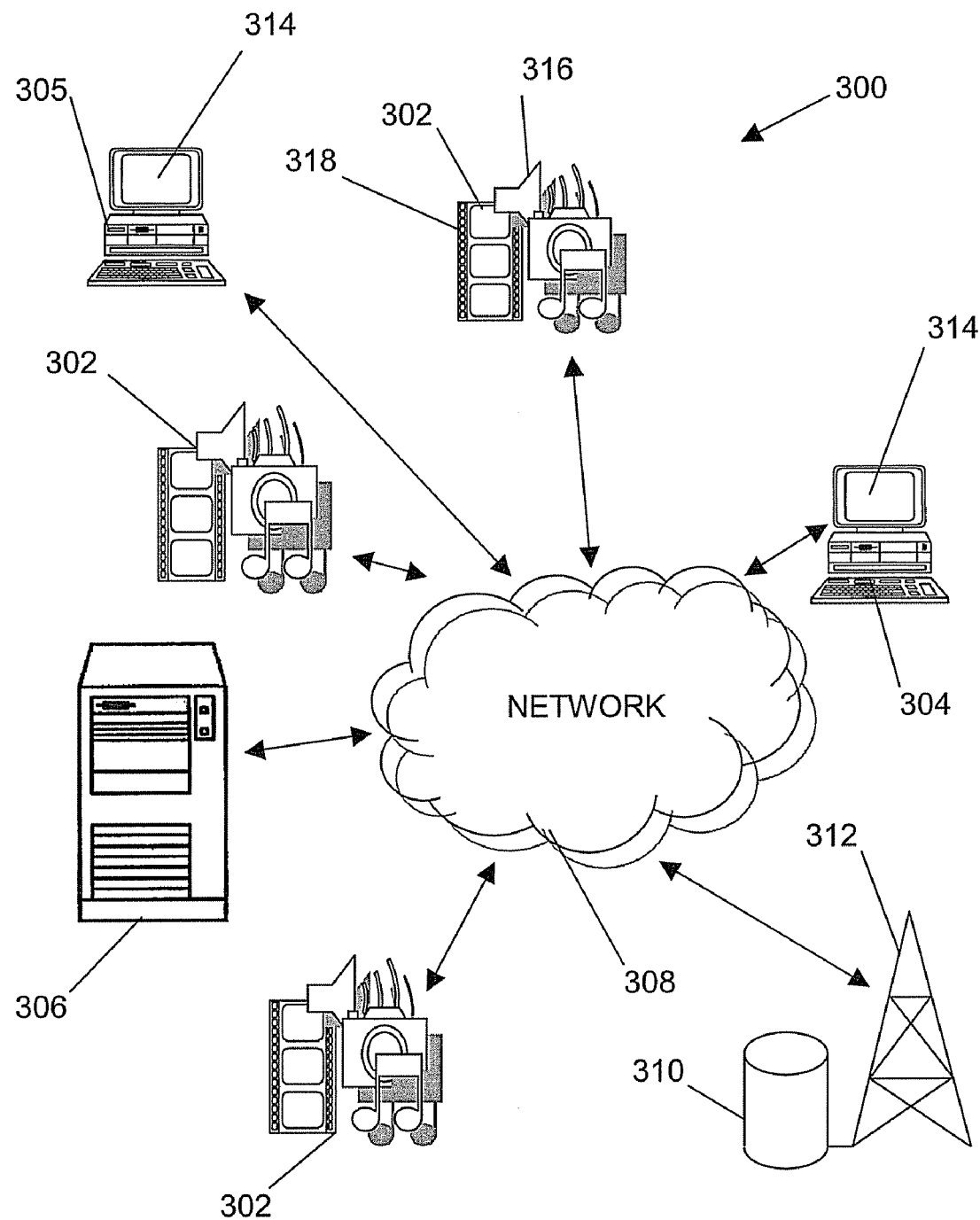
FIG. 3 illustrates a system for implementing embodiments of the invention.

FIG. 3 is a block diagram of an exemplary system 300 for writing and sending emails, while specifying the order of delivery to recipients, and the timing for and priority of recipient responses to the electronic mail according to embodiments of the invention, and graphically illustrates how these blocks interact in operation. The system 300 includes remote devices including one or more multimedia/communication devices 302 equipped with speakers 316 for implementing the audio, as well as display capabilities 318 for facilitating graphical user interface (GUI) aspects of the present invention. In addition, mobile computing devices 304 and desktop computing devices 305 equipped with displays 314 for use with the GUI of the present invention are also illustrated. The remote devices 302 and 304 may be wirelessly connected to a network 308. The network 308 may be any type of known network including a local area network (LAN), wide area network (WAN), global network (e.g., Internet), intranet, etc. with data/Internet capabilities as represented by server 306. Communication aspects of the network are represented by cellular base station 310 and antenna 312. Each remote device 302 and 304 may be implemented using a general-purpose computer executing a computer program for carrying out the GUI described herein. The computer program may be resident on a storage medium local to the remote devices 302 and 304, or may be stored on the server system 306 or cellular base station 310. The server system 306 may belong to a public service. The remote devices 302 and 304, and desktop device 305 may be coupled to the server system 306 through multiple networks (e.g., intranet and Internet) so that not all remote devices 302, 304, and desktop device 305 are coupled to the server system 306 via the same network. The remote devices 302, 304, desktop device 305, and the server system 306 may be connected to the network 308 in a wireless fashion, and network 308 may be a wireless network. In a preferred embodiment, the network 308 is a LAN and each remote device 302, 304 and desktop device 305 executes a user interface application (e.g., web browser) to contact the server system 306 through the network 308. Alternatively, the remote devices 302 and 304 may be implemented using a device programmed primarily for accessing network 308 such as a remote client.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for electronic mail (email) distribution and collaboration, wherein the method comprises:

composing an email message;

designating, in an address field of the email message, two or more recipients for the email message;

assigning a status to each of the two or more recipients as part of the email message;

specifying an order of delivery of the email message to the one or more recipients as part of the email message;

specifying a required response time period to the email message by the two or more recipients; and specifying a priority order of responses to the email message by the one or more recipients, wherein the priority order of responses is based on the assigned status of the two or more recipients as assigned by a composer of the email.

2. The method of claim 1, wherein the order of email message delivery is based on the assigned status of the one or more recipients.

3. The method of claim 1, wherein the assigning of a status divides the one or more recipients into primary and secondary recipients.

4. The method of claim 3, wherein the email message is not sent to the secondary recipients until the one or more primary recipients have responded.

5. The method of claim 3, further comprising revising the email message prior to sending the email message to the secondary recipients based on the responses of the primary recipients.

6. The method of claim 1, wherein a graphical user interface indicates the status of the one or more recipients, and the required response time periods.

7. An article comprising one or more computer-readable storage media containing instructions that when executed by a computer enables electronic mail (email) distribution and collaboration; wherein the method further comprises:

receiving an email message from an originating composer;

the received email message having two or more designated recipients and wherein a status has been assigned to the two or more designated recipients;

and a specified order of delivery, a required response time period, and a priority order of responses has been assigned to the two or more designated recipients by a composer of the message;

distributing the email message based on the assigned status and specified order of delivery to the two or more designated recipients; and relaying email message responses from the two or more designated recipients to the originating composer based on the assigned priority order; wherein the priority order of responses is based on the assigned status of the two or more recipients as assigned by the composer of the email.

8. The article of claim 7, wherein the order of email message distribution is based on the assigned status of the one or more designated recipients.

9. The article of claim 7, wherein the assigning of a status divides the one or more recipients into primary and secondary recipients.

10. The article of claim 9, wherein the email message is not distributed to the secondary recipients until the one or more primary recipients have responded.

11. The article of claim 9, wherein the email message is sent to the originating composer for revision, prior to sending the email to the secondary recipients.

12. The article of claim 7, wherein a graphical user interface is provided to indicate the status of the one or more recipients, and the required response time periods.

* * * * *